Patented July 11, 1933

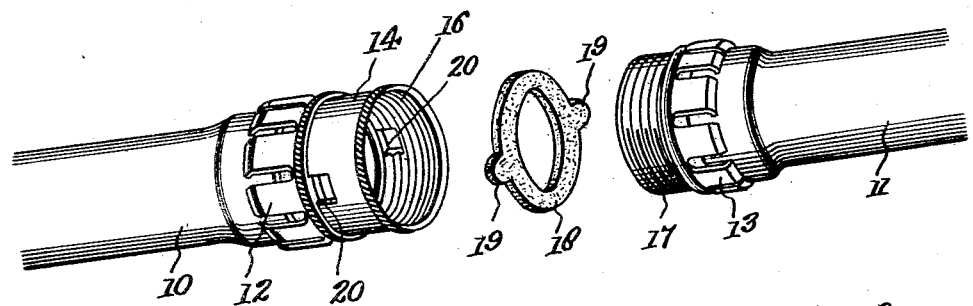
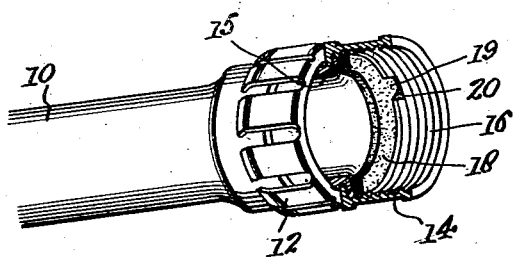
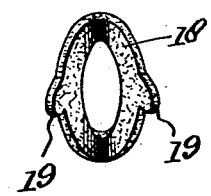
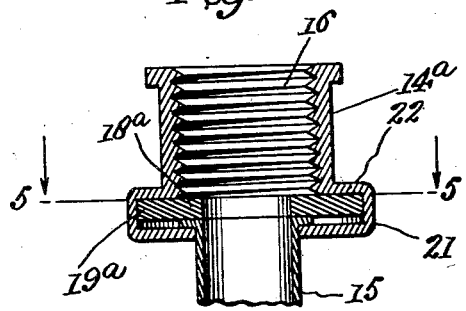
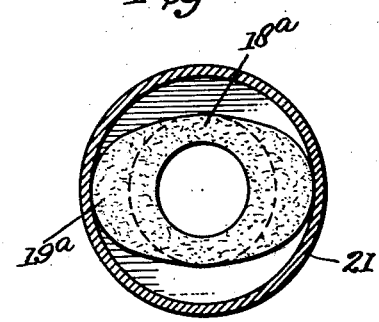
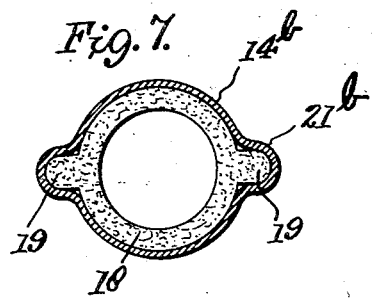
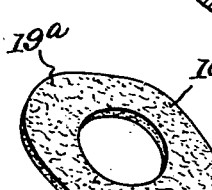

1,917,553

UNITED STATES PATENT OFFICE

ALBERT J. SCHOLTES, OF BALTIMORE, MARYLAND

HOSE UNION

Application filed December 14, 1932. Serial No. 647,258.

The present invention relates to improvements in hose unions, and has for an object to provide an improved union or coupling for hose or other pipe in which the washer or gasket is held securely in one member of the coupling when the coupling is separated or uncoupled.

At the present time great annoyance and loss is sustained by the fact that the washers or gaskets accidentally fall out of the couplings when the latter are unscrewed. Much time and patience is required to retrieve the washers and replace the same in the couplings.

The invention aims to obviate these difficulties and to provide in a simple and inexpensive construction an improved form of coupling member and washer so associated and related that the washer may be readily introduced into the coupling member, and when so introduced will be retained therein against accidental loss.

With the foregoing and other objects in view, the invention will be more fully described hereinafter, and will be more particularly pointed out in the claim appended hereto.

In the drawing, wherein like symbols refer to like or corresponding parts throughout the several views, Figure 1 is a perspective view of the parts separated, showing an improved form of hose union constructed in accordance with the present invention.

Figure 2 is also a perspective view showing parts broken away and parts in section of one member of the union with the flexible washer seated therein.

Figure 3 is a perspective view of one form of flexible washer employed showing the same in the squeezed or distorted position ready for insertion in the coupling sleeve.

Figure 4 is a longitudinal section taken through the female portion of the coupling and showing a modified form of construction.

Figure 5 is a cross section taken on the line 5—5 in Figure 4.

Figure 6 is a perspective view of an elliptical or oval form of washer, and

Figure 7 is a sectional view showing a further modified form.

Referring more particularly to Figures 1 to 3 of the drawing the hose sections are indicated generally at 10 and 11. The clamp members of the coupling or union are indicated at 12 and 13. One hose section carries the rotatable female sleeve 14 extending rotatably about the nipple 15 and having internal threads 16 to mate with the external threads upon the male member 17. In accordance with the invention, the sleeve 14 is modified to cooperate with the washer, interlocking parts being provided upon the sleeve and washer. In the form shown in Figures 1 to 3, a gasket 18 is provided of flexible material having diametrically opposed lugs 19 of any desired shape. These lugs are adapted to engage through openings or slots 20 formed in the sleeve 14. In Figure 3 the washer 18 is shown as squeezed together or distorted with the lugs 19 approaching one another so as to clear the inside cylindrical threaded wall of the sleeve 14 until such lugs arrive opposite the slots 20; whereupon, due to the inherent resiliency of the washer 18 the same will tend to regain its normal shape, which normal shape is indicated in Figure 1; thus thrusting the lugs 19 out through the slots 20. The outer walls of the slots 20 will form abutments reacting against the lugs 20 to retain the washer in place and against loss when the union is uncoupled.

In accordance with the form of invention shown in Figures 4, 5 and 6, an oval form of washer 18ª is shown. The inner opening of this washer will be of the same diameter as the nipple 15. This feature is shown in Figure 4; but the external configuration of the washer 18ª is oval, elliptical or of other irregular form whereby to form enlarged lugs or portions 19ª adapted to be received into a pressed-out part 21 of the modified form of sleeve 14ª. This pressed-out part 21 forms an interior groove which is preferably annular or of uniform diameter, as best seen in Figure 5. This will permit the washer 18ª to rotate about in this circular recess, the front wall 22 of which will act as an abutment to prevent the washer from moving out of the sleeve. In this form of the invention the washer is taken by its long axis and squeezed together, being then pushed into the sleeve 14ᵃ until it arrives at the circular groove or embossed portion 21; whereat it is permitted to expand out into normal shape. In this form of the invention the washer need not be applied in any particular angular position as the lugs 19 are required to be placed in the form of the invention shown in Figures 1, 2 and 3 in order that they may arrive opposite the slots 20. In other words the oval form of washer 18ᵃ may be applied in any position and need not be rotated around to any given fixed angular position relative to the sleeve.

In Figure 7 I have shown a further modified form of the invention in which the sleeve 14ᵇ is similar to Figure 1 except that instead of having through slots 20 embossed or pressed-out portions 21ᵇ are provided to receive the lugs 19 of the washer 18. In this case no air pockets are possible. When the male member 17 engages the washer it compresses the washer and makes a tight joint and when the male member is removed the washer is prevented from falling out of the sleeve, thus preventing annoyance and expense incident to the loss of such washers.

It is obvious that various changes and modifications may be made in the detail of construction and design of the above specifically described embodiment of this invention without departing from the spirit thereof, such changes and modifications being restricted only by the scope of the following claim.

What is claimed is:—

A hose union including a sleeve having diametrically opposed outwardly pressed portions to form housings, and a flexible washer having diametrically opposed projecting parts adapted to be squeezed together to enter the sleeve and to be subsequently expanded to allow the projecting parts to enter the outwardly pressed portion to be housed therein to prevent rotation of the washer and to prevent air pockets from forming in said union.

In testimony whereof I affix my signature.

ALBERT J. SCHOLTES.